(12) United States Patent
Williamson et al.

(10) Patent No.: US 12,196,972 B1
(45) Date of Patent: Jan. 14, 2025

(54) HEAD SUPPORT FOR HEAD-MOUNTED DISPLAY

(71) Applicants: Heidi Williamson, San Francisco, CA (US); James A. Stryker, San Francisco, CA (US); Andrew Gallaher, Sunnyvale, CA (US)

(72) Inventors: Heidi Williamson, San Francisco, CA (US); James A. Stryker, San Francisco, CA (US); Andrew Gallaher, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 390 days.

(21) Appl. No.: 17/505,736

(22) Filed: Oct. 20, 2021

Related U.S. Application Data (63) Continuation of application No. 16/570,516, filed on Sep. 13, 2019, now Pat. No. 11,181,748.

(60) Provisional application No. 62/821,664, filed on Mar. 21, 2019, provisional application No. 62/736,531, filed on Sep. 26, 2018.

(51) Int. Cl.
*G02B 27/01* (2006.01)
*G02B 27/00* (2006.01)
*G06F 1/16* (2006.01)

(52) U.S. Cl.
CPC ..... *G02B 27/0176* (2013.01); *G02B 27/0093* (2013.01); *G06F 1/163* (2013.01); *G02B 2027/0154* (2013.01); *G02B 2027/0161* (2013.01)

(58) Field of Classification Search
CPC ............ G02B 27/0176; G02B 27/0093; G02B 2027/0154; G02B 2027/0161; G06F 1/163
See application file for complete search history.

(56) References Cited

U.S. PATENT DOCUMENTS

| | | | |
|---|---|---|---|
| 5,642,221 | A | 6/1997 | Fischer et al. |
| 5,767,820 | A | 6/1998 | Bassett et al. |
| 5,844,656 | A | 12/1998 | Ronzani et al. |
| 6,448,944 | B2 | 9/2002 | Ronzani et al. |

(Continued)

FOREIGN PATENT DOCUMENTS

| | | |
|---|---|---|
| CN | 206489325 U | 9/2017 |
| CN | 104793338 B | 8/2018 |

(Continued)

OTHER PUBLICATIONS

Griplock Systems, "Cable Suspension Systems, ZF-30X2", https://www.griplocksystems.com/product/zf-30x2, Downloaded Apr. 20, 2020 (3 pp).

(Continued)

*Primary Examiner* — Brent D Castiaux
(74) *Attorney, Agent, or Firm* — Young Basile Hanlon & MacFarlane, P.C.

(57) ABSTRACT

A head-mounted display unit includes a display assembly and a head support coupled to the display assembly that supports the head-mounted display unit worn on a head of a user. The head support includes a band that is formed from a stretchable material to allow for expansion and contraction of the band, a cord that extends through the band, and an adjustment mechanism that is coupled to the cord and is configured to extend and retract the cord to thereby shorten and lengthen the head support.

23 Claims, 7 Drawing Sheets

(56) References Cited

U.S. PATENT DOCUMENTS

| | | | |
|---|---|---|---|
| 8,040,292 B2 | 10/2011 | Ronzani et al. | |
| 8,545,013 B2 | 10/2013 | Hwang et al. | |
| 9,927,618 B2 | 3/2018 | Allin et al. | |
| D829,208 S | 9/2018 | Dallmeyer et al. | |
| 10,408,313 B1 * | 9/2019 | Sullivan | F16H 19/06 |
| 10,509,438 B1 | 12/2019 | Magrath | |
| D874,459 S | 2/2020 | Limaye et al. | |
| 2009/0091838 A1 | 4/2009 | Zaloum et al. | |
| 2009/0128450 A1 * | 5/2009 | Nakabayashi | G02B 27/0176 |
| | | | 345/8 |
| 2010/0327028 A1 | 12/2010 | Nakabayashi et al. | |
| 2015/0185764 A1 * | 7/2015 | Magi | A41D 13/08 |
| | | | 361/679.03 |
| 2015/0219901 A1 | 8/2015 | Morimoto | |
| 2016/0054570 A1 | 2/2016 | Bosveld et al. | |
| 2016/0062125 A1 | 3/2016 | Baek et al. | |
| 2016/0216512 A1 | 7/2016 | Miller et al. | |
| 2016/0286163 A1 | 9/2016 | Edwards | |
| 2017/0017085 A1 | 1/2017 | Araki et al. | |
| 2017/0227793 A1 | 8/2017 | Abreu | |
| 2018/0055202 A1 | 3/2018 | Miller et al. | |
| 2018/0256942 A1 | 9/2018 | Love | |
| 2018/0295733 A1 | 10/2018 | Wen et al. | |
| 2019/0141847 A1 * | 5/2019 | Chang | G02B 27/00 |
| 2019/0204606 A1 * | 7/2019 | Yang | H04R 5/0335 |
| 2019/0220056 A1 | 7/2019 | Yan | |
| 2019/0243145 A1 | 8/2019 | Ellis et al. | |
| 2019/0346682 A1 | 11/2019 | Kang et al. | |
| 2020/0008533 A1 | 1/2020 | Hammerslag et al. | |
| 2020/0170327 A1 | 6/2020 | Yee | |
| 2022/0187609 A1 | 6/2022 | Snyder et al. | |

FOREIGN PATENT DOCUMENTS

| | | |
|---|---|---|
| CN | 105661735 B | 6/2019 |
| EP | 2229880 A1 | 9/2010 |
| WO | 2017113487 A1 | 7/2017 |
| WO | 2018124344 A1 | 7/2018 |
| WO | 2020038004 A1 | 2/2020 |

OTHER PUBLICATIONS

IFIXIT, "Oculus Rift CV1 Teardown", Published Mar. 30, 2016, https://www.ifixit.com/Teardown/Oculus+Rift+CV1+Teardown/60612#s126787 (14 pp).

IFIXIT, "PlayStation VR Teardown", Published Oct. 13, 2016, https://www.ifixit.com/Teardown/PlayStation+VR+Teardown/69341 (16 pp).

* cited by examiner

HEAD SUPPORT FOR HEAD-MOUNTED DISPLAY

CROSS-REFERENCE TO RELATED APPLICATION(S)

This application is a continuation of U.S. patent application Ser. No. 16/570,516, filed Sep. 13, 2019, which claims priority to and the benefit of U.S. Provisional Patent Application No. 62/821,664, filed Mar. 21, 2019, and U.S. Provisional Patent Application No. 62/736,531, filed Sep. 26, 2018, each of which is incorporated by reference herein in its entirety.

TECHNICAL FIELD

This disclosure relates to a display system and, in particular, head-mounted display units and supports therefor.

BACKGROUND

Head-mounted displays (HMD) are electronic devices that display graphics to a user wearing the head-mounted display, for example, when participating in activities related to computer-generated, augmented, virtual, and/or mixed realities. The head-mounted display may be worn by a user for extended durations, so comfort and fit are a high priority for a user. Existing head-mounted displays can be attached to or include comfort headbands, for example, comprised of elastic and/or silicone material, but many sizing options are required for this type of headband to sufficiently cover the spectrum of head sizes of users wearing the head-mounted display.

Additionally, different users will position a headband in different orientations to achieve a comfortable fit for the head-mounted display, changing forces experienced along various portions of the headband when the different users wear the head-mounted display in different orientations. The variety of forces experienced by the various portions of the headband can change both performance and comfort of the headband.

SUMMARY

Disclosed herein are implementations of a head-mounted display unit and head supports therefor.

A head-mounted display unit includes a display assembly and a head support coupled to the display assembly that supports the head-mounted display unit worn on a head of a user. The head support includes a band and an adjustment mechanism coupled to the band to lengthen the head support and keep the band in tension during extension and retraction of the head support. There are castellations disposed within band, and the castellations define openings through which a portion of the adjustment mechanism is routed through the band.

A head-mounted display unit includes a display assembly and a head support coupled to the display assembly that supports the head-mounted display unit worn on a head of a user. The head support includes a band and an adjustment mechanism coupled to the band to lengthen the head support. The adjustment mechanism includes a base, a spool rotatably coupled to the base, a spring rotatably coupled at a first end to the base and fixedly coupled at a second end to the spool, and a cord that extends through the band and is fixedly coupled at a first end to the spool. The spring applies torque to the spool to maintain the cord in tension.

A head-mounted display unit includes a display assembly and a head support coupled to the display assembly that supports the head-mounted display unit worn on a head of a user. The head support includes a band and an adjustment mechanism coupled to the band to lengthen the head support. The adjustment mechanism includes a base, a spool coupled to the base, a tape that extends from the adjustment mechanism through the band, and springs rotatably coupled at first ends to the spool and fixedly coupled at second ends to the tape. The springs apply force to the tape to maintain the tape in tension during expansion and retraction of the band.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A head-mounted display unit having a head support configured to support the head-mounted display unit on different-sized heads of a variety of users is described below. The head support includes a band (e.g., a headband) that extends around the heads of the users and one or more adjustment mechanisms that allow the head support to provide generally constant force (e.g., a nominal force+/−10% as depicted on a force by distance curve) irrespective of the length of the band, the position of the adjustment mechanism, or the position of the head support as worn by the variety of users.

Figure 1:
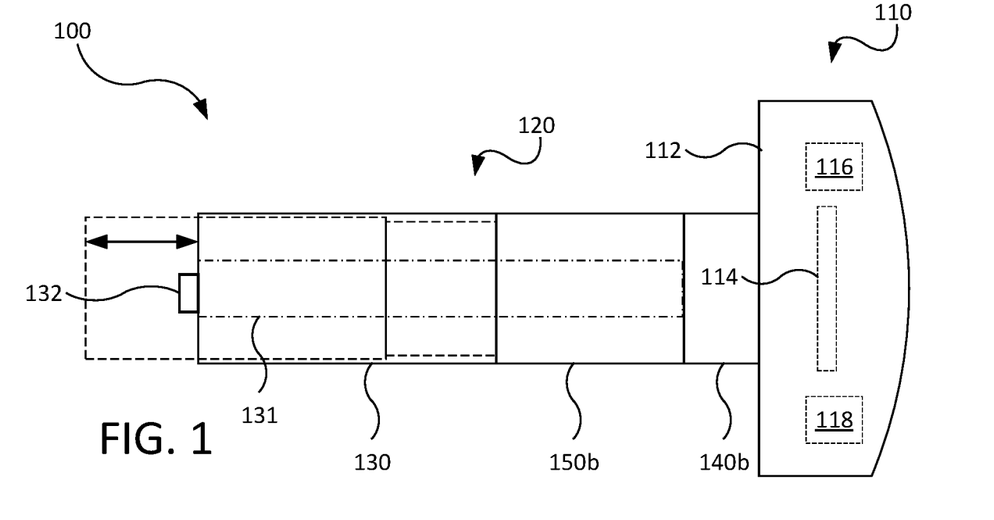
FIG. 1 is a side view of a head-mounted display unit in a retracted state and an expanded state (dashed lines).
Figure 2:
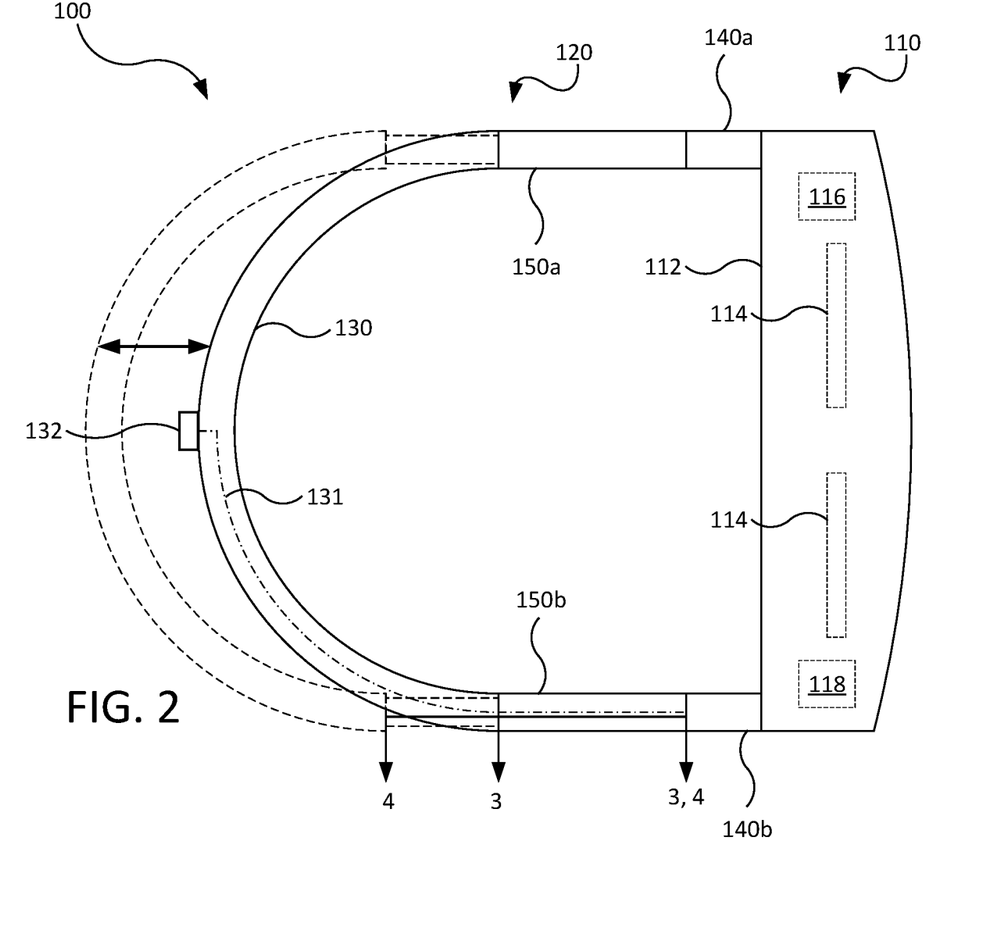
FIG. 2 is a top view of the head-mounted display unit of FIG. 1 in the retracted state and the expanded stated (dashed lines).

Referring to FIGS. 1 and 2, a head-mounted display unit 100 (HMD) includes a display assembly 110 and a head support 120. The display assembly 110, for example, includes a housing 112 and various electronics therein, such as one or more displays 114, sensors 116 (e.g., detecting gaze and/or user status), and power electronics 118, which are depicted schematically and in dashed lines to illustrate being hidden from view.

The head support 120 is coupled to left and right sides of the display assembly 110 (e.g., to the housing 112), extending rearward of the display assembly 110 and between the left and right sides thereof. When the head-mounted display unit 100 is worn on a head of a user, the display assembly 110 extends across a front of the head of the user (i.e., the face of the user), while the head support 120 extends rearward along left and right sides of the head of the user and across a rear of the head of the user. Thus, the display assembly 110 and the head support 120 cooperatively extend around the head of the user.

The head support 120, as referenced above, is adjustable in length between a retracted position (solid lines) and an extended position (dashed lines) and is configured to provide a generally constant force regardless of the length thereof. The head support 120 includes a band 130, one or more attachment mechanisms 140*a*, 140*b* (e.g., two as shown on the left and right sides), and one or more adjustment mechanisms 150*a*, 150*b* (e.g., two as shown on the left and right sides).

The band 130 forms a primary portion of the head support 120, which engages the head of the user to support the head-mounted display unit 100 worn on the head of the user. Each of the attachment mechanisms 140*a*, 140*b* removably couples the head support 120 to the display assembly 110. Each of the adjustment mechanisms 150*a*, 150*b* extends between one of the attachment mechanisms 140*a*, 140*b* and the band 130 and allows the head support 120 to change length overall by changing the length between the band 130 and the attachment mechanisms 140*a*, 140*b*. Though two adjustment mechanisms 150*a*, 150*b* are shown as acting from opposing sides of the head support 120, the head support 120 may alternatively employ a single adjustment mechanism (e.g., adjustment mechanism 150*a*).

The band 130 is flexible to accommodate different shapes of heads of the users. The band 130 may, for example, be formed of or otherwise include an elastic or silicone material. The band 130 may also be configured to transfer electrical power from a power source (e.g., an external battery) to the display assembly 110. For example, the band 130 may include a flexible circuit 131 extending from a power connector 132 to the attachment mechanism 140*b*, either bypassing or extending through the adjustment mechanism 150*b*. The attachment mechanism 140*b* electrically connects to a corresponding power connector (not shown) of the display assembly 110. The flexible circuit 131 (hidden; illustrated in dash-dot lines) may, for example, be embedded in the elastic or silicone material of the band 130 or otherwise hidden from view by the material of the band 130. The flexible circuit 131, while being flexible, may be inelastic, such that the band 130, or the portion of the band having the flexible circuit 131, is also inelastic.

Figure 3:
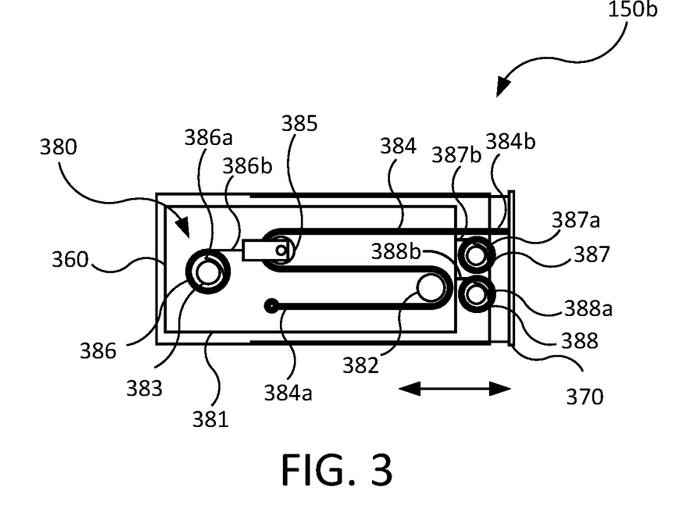
FIG. 3 is a cross-sectional view of an adjustment mechanism of the head-mounted display unit of FIG. 1 in the retracted state taken along line 3-3 in FIG. 2.
Figure 4:
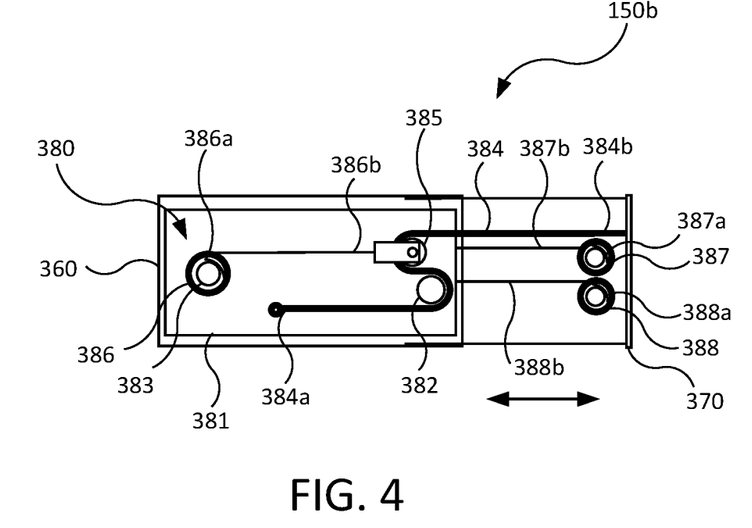
FIG. 4 is a cross-sectional view of the adjustment mechanism of the head-mounted display unit of FIG. 1 in the expanded state taken along line 4-4 in FIG. 2.

Referring to FIGS. 3 and 4, the adjustment mechanism 150*b* of the head support 120 shown in FIGS. 1 and 2 is configured as a telescoping mechanism having a stationary telescoping structure 360, a sliding telescoping structure 370, and a tension mechanism 380 generally contained by the stationary telescoping structure 360 and/or the sliding telescoping structure 370. The stationary telescoping structure 360 is stationary relative to the display assembly 110 when coupled thereto, while the sliding telescoping structure 370 slides relative to the stationary telescoping structure 360 and, thereby, moves relative to the display assembly 110.

The sliding telescoping structure 370 is positioned within the stationary telescoping structure 360 and slides relative thereto between a retracted position (FIG. 3) and an extended position (FIG. 4). The stationary telescoping structure 360 may, for example, be fixedly coupled to the display assembly 110 (e.g., via the attachment mechanisms 140*b*), while the sliding telescoping structure 370 may be fixedly coupled to the band 130. As the sliding telescoping structure 370 moves between the retracted position (FIG. 3) and the extended position (FIG. 4), the length of the head support 120 (e.g., the distance between the band 130 and the attachment mechanism 140*b*) increases.

The sliding telescoping structure 370 and the stationary telescoping structure 360 may have complementary and constant cross-sectional shapes (e.g., ovular, rectangular, etc.), such that an outer surface of the sliding telescoping structure 370 engages an inner surface of the stationary telescoping structure 360 and slides therealong. Instead or additionally, the sliding telescoping structure 370 and/or the stationary telescoping structure 360 may include guides (e.g., nylon slides, not shown) that engage and slide against the corresponding surface of the other. The sliding telescoping structure 370 and the stationary telescoping structure 360 may further includes stops (not shown) that prevent relative movement therebetween, that is, from retracting beyond the retracted position or extending beyond the extended position. While the sliding telescoping structure 370 is described as being within the stationary telescoping structure 360, the stationary telescoping structure 360 may instead be within the sliding telescoping structure 370.

The tension mechanism 380 applies force between the sliding telescoping structure 370 and the stationary telescoping structure 360, such that the head support 120 is in tension when engaging and extending around the head of the user. The tension mechanism 380 is, for example, configured to apply a generally constant tensive force between the sliding telescoping structure 370 and the stationary telescoping structure 360 irrespective of a position of the sliding telescoping structure 370 in respect to the stationary telescoping structure 360.

As shown in FIG. 3, the tension mechanism 380 includes a base 381 (e.g., a chassis), bosses 382, 383, a cord 384, a pulley 385, and constant-force extension springs 386, 387, 388.

The base 381 is fixedly coupled to the stationary telescoping structure 360. The bosses 382, 383 are fixedly coupled to the base 381.

The cord 384 is inelastic and extends through the base 381 in a serpentine manner, so as to form three segments that are generally parallel with each other. A first end 384*a* of the cord 384 can be fixedly coupled to the base 381, for example, proximate the attachment mechanism 140. A second end 384*b* can be coupled to the sliding telescoping structure 370, for example, proximate the band 130 (e.g., fixedly coupled directly to the sliding telescoping structure 370 as shown in dashed line in FIGS. 3 and 4). Between the first end 384a and the second end 384b, the cord 384 is wound approximately 180 degrees around the boss 382 of the base 381 and approximately 180 degrees around the pulley 385.

The pulley 385 slides relative to the base 381 back and forth generally parallel with the segments of the cord 384. The constant-force extension spring 386 applies a generally constant force between the base 381 and the pulley 385. The constant-force extension spring 386, for example, includes several coils of a flat metal material (e.g., steel, copper) that extend between an inner end 386a and an outer end 386b. As the outer end 386b is extended relative to the inner end 386a, the constant-force extension spring 386 applies a generally constant force to the outer end 386b over a length of travel (e.g., corresponding to movement between the retracted and extended positions). The constant-force extension spring 386 is positioned around another boss 383 of the base 381 with the inner end 386a wrapped around the boss 383, allowing rotation of the constant-force extension spring 386 and/or the boss 383 relative to the base 381. The outer end 386b of the constant-force extension spring 386 is fixedly coupled to the pulley 385.

With the force applied by the constant-force extension spring 386 between the boss 383 and the pulley 385, the pulley 385 applies force to the cord 384 to place the cord 384 in tension between the boss 382 of the base 381 and the sliding telescoping structure 370. Due to mechanical advantage of the pulley 385, the force of the constant-force extension spring 386 is equal to double the tension of the cord 384. The force of the constant-force extension spring 386 and, thereby, the tension of the cord 384, remain generally constant as the sliding telescoping structure 370 and, thereby, the cord 384, move the distance between the retracted position (FIG. 3) and the extended position (FIG. 4).

In the embodiment shown in FIGS. 3 and 4, to apply tension between the stationary telescoping structure 360 and the sliding telescoping structure 370, the constant-force extension springs 387, 388 can be coupled at first ends 387a, 388a to the sliding telescoping structure 370 (e.g., rotatable about bosses, not numbered) and at second ends 387b, 388b to the stationary telescoping structure 360. The constant-force extension springs 387, 388 maintain a generally-constant tension between the stationary telescoping structure 360 and the sliding telescoping structure 370 as elongation (FIG. 4) and retraction (FIG. 3) of the sliding telescoping structure 370 occurs. The additional constant-force extension springs 387, 388 are described here and shown in FIGS. 3 and 4 as two in number but can number between one and many to provide appropriate tension, force generation, and smooth, controlled elongation (FIG. 3) and retraction (FIG. 3) of the sliding telescoping structure 370.

Figure 5:
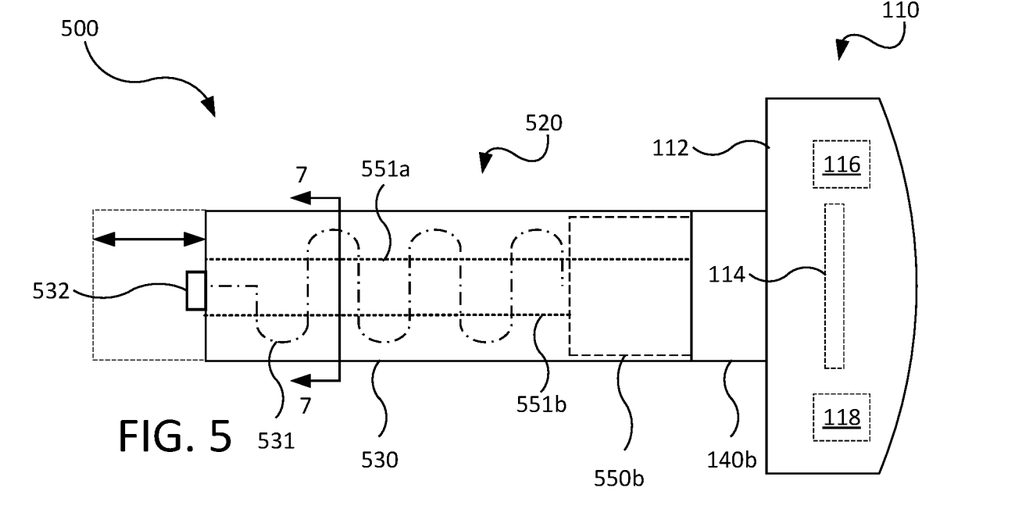
FIG. 5 is a side view of another head-mounted display unit in a retracted state and an expanded state (dashed lines).
Figure 6:
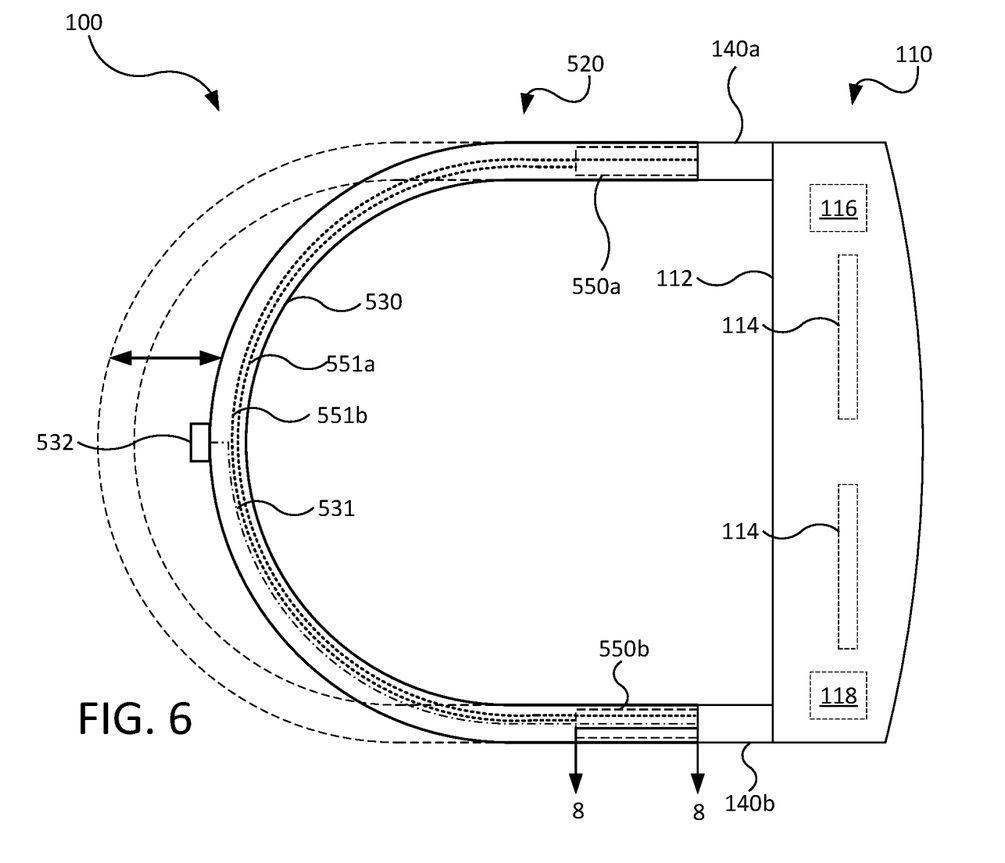
FIG. 6 is a top view of the head-mounted display unit of FIG. 5 in the retracted state and the expanded stated (dashed lines).

Referring to FIGS. 5 and 6, a head-mounted display unit 500 is a variation of the head-mounted display unit 100 and includes the display assembly 110 (described above) and a head support 520. As with the head support 120, the head support 520 is adjustable in length between a retracted position (solid lines) and an extended position (dashed lines). The head support 520 is configured to provide a generally constant force regardless of the length thereof. The head support 520 includes a band 530, one or more attachment mechanisms 140a, 140b (as described above; e.g., two as shown on the left and right sides), and one or more adjustment mechanisms 550a, 550b (hidden; illustrated in long-dash lines; e.g., two as shown on the left and right sides).

As with the band 130, the band 530 forms a primary portion of the head support 520 and engages the head of the user to support the head-mounted display unit 100 worn on the head of the user. The band 530 is formed of or otherwise includes a stretchable material, such as silicone, a constant-force structure, an engineered textile, an engineered elastomer, and/or a folded material (e.g., accordion, honeycomb, etc.) that provides structure and allows expansion and retraction of the band 530. As with the band 130, the band 530 may also be configured to transfer electrical power from a power source (e.g., an external battery) to the display assembly 110. For example, the band 530 may include a power cable 531 (hidden; illustrated in dash-dot lines) that, as with the flexible circuit 131, extends from a power connector 532 to the attachment mechanism 140, either bypassing or extending through the adjustment mechanism 550.

Each of the attachment mechanisms 140a, 140b removably couples the head support 520 to the display assembly 110. One of the attachment mechanisms 140b also electrically connects to a corresponding power connector (not shown) of the display assembly 110.

The adjustment mechanisms 550a, 550b (e.g., two as shown) each include a cord 551a, 551b (hidden; illustrated in short dashed lines) that extends through the band 530 and is retractable into and extendable from the corresponding adjustment mechanism 550a, 550b, thereby shortening and lengthening, respectively, the head support 520. In the case of the head support 520 including two adjustment mechanisms 550a, 550b as shown, each of the cords 551a, 551b extends from one of the adjustment mechanisms 550a, 550b and is fixedly coupled to one of the attachment mechanisms 140b, 140a. Each of the cords 551a, 551b is routed through castellations in the band 530 as further described in reference to FIG. 7A. In the case of the head support 520 including only one adjustment mechanism (e.g., as described in reference to FIG. 7B), a single cord 551 may extend from the adjustment mechanism on one side of the head-mounted display unit 500 and be fixedly coupled to the other side thereof (e.g., to the opposing attachment mechanism).

As the cords 551a, 551b retract into and extend from the adjustment mechanisms 550a, 550b to span different lengths between the two sides of the head-mounted display unit 500, the band 530 similarly decreases or increases in length. The stretchable material forming or included within the band 530 may also surround the adjustment mechanisms 550a, 550b.

In the example of FIG. 5, the power cable 531 is arranged in a serpentine manner (e.g., with alternating sinusoidal shapes) within the band 530 so as to not restrict expansion and retraction of the band 530 as it stretches and contracts to fit heads of varying users. Maintaining shape and tension of the band 530 while allowing movement of the power cable 531 and the cords 551a, 551b within the band 530 can be further supported using the castellations as described in reference to FIGS. 7A and 7B and the adjustment mechanisms 550a described in reference to FIG. 8.

Figure 7A:
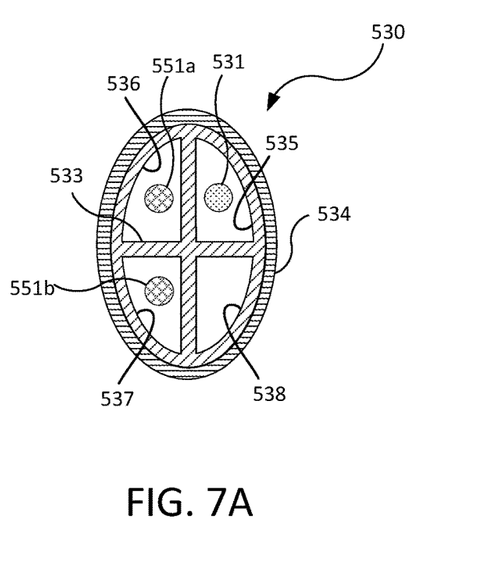
FIGS. 7A and 7B are cross-sectional views of a band of the head-mounted display unit of FIG. 5 taken along line 7-7 in FIG. 5.

Referring to FIG. 7A, the band 530 of FIGS. 5 and 6 is shown in shaded cross-section. At this cross-sectional location, the band 530 includes the power cable 531 (e.g., with a dotted pattern), a castellation 533 (e.g., with a diagonal line pattern), support material 534 (e.g., with a horizontal line pattern), and the cords 551a, 551b (e.g., with cross-hatch patterns). An outer cover, for example, a fabric material, is not shown.

The castellation 533 acts as a support for the band 530 and can be formed of a rigid, smooth material, for example, a polymer or a low-friction polycarbonate with or without anti-friction coating, that allows smooth movement of the power cable 531 and the cords 551a, 551b through the band 530 while prohibiting the power cable 531 and the cords 551a, 551b from frictionally interfering with the support material 534 or each other. The castellation 533 acts, for example, as a washer or bearing inside the sleeve of support material 534.

The power cable 531 extends through a first opening 535 in the castellation 533, the cord 551a extends through a second opening 536 in the castellation 533, the cord 551b extends through a third opening 537 in the castellation 533, and a fourth opening 538 in the castellation 533 is empty in this example, though other routings are possible that allow the band 530 to stretch without interference between the power cable 531 and the cords 551a, 551b. The castellation 533 is shown with four openings 535, 536, 537, 538, but any number of openings from one to many are possible. The size of the openings 535, 536, 537, 538 can also vary, and features can be added to the castellation 533 (e.g., rollers, surface treatments, bearings, etc.) to further reduce friction caused by movement of the power cable 531 and the cords 551a, 551b within the band 530.

The support material 534 can be formed of or otherwise include a stretchable material, such as silicone or an engineered elastomer, that allows expansion and retraction of the band 530 while providing support and locating features (not shown) for the castellation 533. In another example (not shown), the support material 534 can be formed of a constant-force structure, an engineered textile with a set geometric pattern, and/or a folded material (e.g., accordion, honeycomb, etc.) Though a single castellation 533 is shown in FIG. 7A for descriptive purposes, the band 530 generally includes multiple castellations similar to the castellation 533 distributed along the band 530, and the power cable 531 can be routed through the band 530 in a serpentine or sinusoidal manner, alternating routing through upper and lower (e.g., opposing) openings 535, 538 in successive castellations to better allow for expansion and retraction of the band 530 while reducing friction between the power cable 531 and the cords 551a, 551b. This alternating routing is consistent with the routing pattern shown for the power cable 531 in FIG. 5.

Figure 7B:
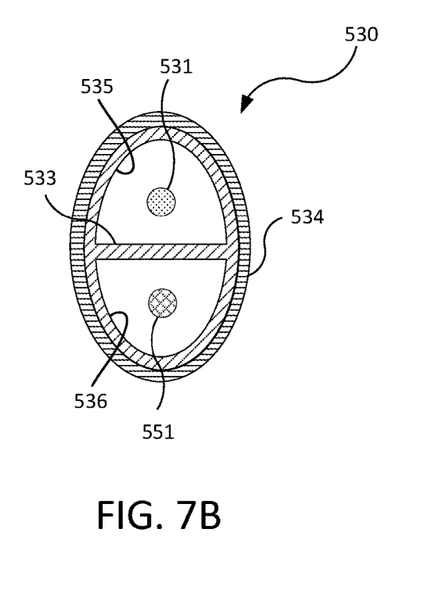

Referring to FIG. 7B, the band 530 of FIGS. 5 and 6 is shown in shaded cross-section in an alternative configuration to that of FIG. 7A. For example, the band 530 in FIG. 7B includes the power cable 531 (e.g., with a dotted pattern), the castellation 533 (e.g., with a diagonal line pattern), support material 534 (e.g., with a horizontal line pattern), and a singular cord 551 (e.g., with a cross-hatch pattern). An outer cover, for example, a fabric material, is not shown. The power cable 531 extends through a first opening 535 in the castellation 533 and the cord 551 extends through a second opening 536 in the castellation 533 in this example, consistent with use of a single adjustment mechanism vs. multiple adjustment mechanisms 550a, 550b.

Figures 8A, 8B:
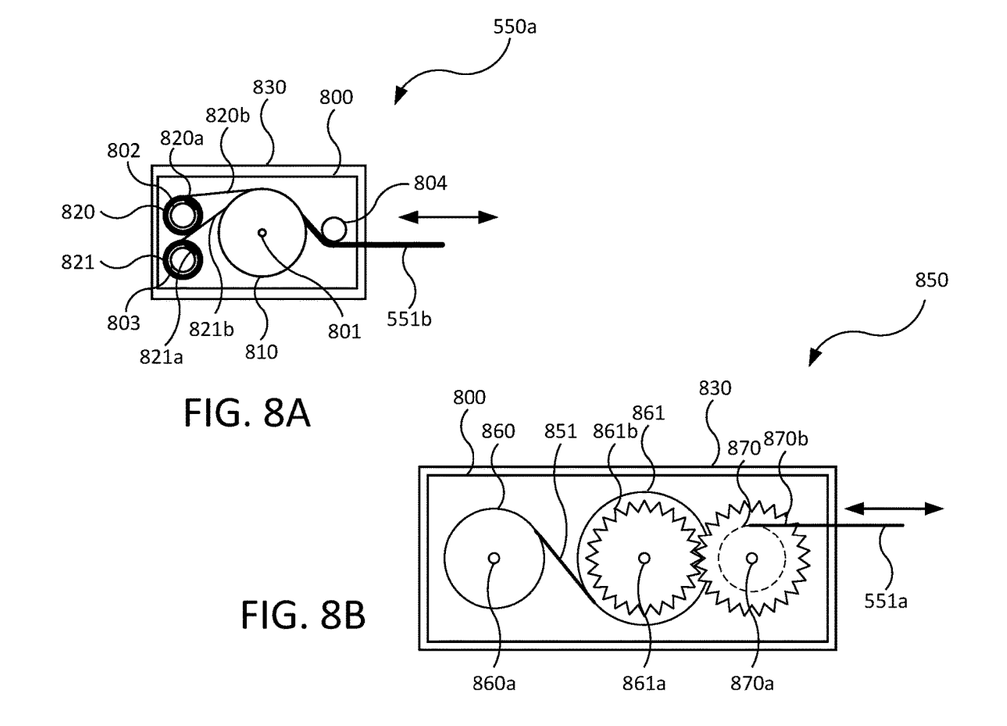
FIG. 8A is a cross-sectional view of an adjustment mechanism of the head-mounted display unit of FIG. 5 taken along line 8-8 in FIG. 6.
FIG. 8B is a cross-sectional view of an adjustment mechanism of the head-mounted display unit of FIG. 5 taken along line 8-8 in FIG. 6.

Referring to FIG. 8A, the adjustment mechanism 550a of FIGS. 5 and 6 includes a base 800, a spool 810, and constant-force extension springs 820, 821. Though two constant-force extension springs 820, 821 are shown and described here, the number of constant-force extension springs may vary from one to many. The adjustment mechanism 550a may further include a housing 830 that surrounds and covers from view the base 800, the spool 810, and the constant-force extension springs 820, 821. The housing 830 is coupled to, surrounds, or may form a portion of the base 800.

The spool 810 is rotatably coupled to the base 800. For example, the base 800 may include a boss 801 (e.g., protrusion or post) that is received by a central aperture of the spool 810 and around which the spool 810 rotates.

The constant-force extension springs 820, 821 can apply tangential force to the spool 810, so as to generate torque. The constant-force extension springs 820, 821 are configured as the constant-force extension springs 386, 387, 388 described in FIGS. 3 and 4, for example, being formed of several coils of a flat metal material (e.g., steel, copper) that extend between inner ends 820a, 821a and outer ends 820b, 821b. Each of the constant-force extension springs 820, 821 rotate around one of two bosses 802, 803 of the base 800 with inner ends 820a, 821a rotatable around the respective bosses 802, 803, allowing a rotating motion relative to the bosses 802, 803 and/or the base 800. The outer ends 820b, 821b of the constant-force extension springs 820, 821 are coupled to the spool 810 (e.g., being received in a spring channel or other guide mechanism thereof) and can overlay each other or be spaced along a perimeter of the spool 810 allowing the constant-force extension springs 820, 821 to wind or wrap (and unwind or unwrap) around the spool 810.

Given the wrapping-style configuration, the constant-force extension springs 820, 821 can apply the tangential force to the spool 810 to create torque about the boss 801 of the base 800. As the spool 810 is rotated, the constant-force extension springs 820, 821 are either wound about the spool 810 (e.g., in the spring channel or other mechanism referenced above) or unwound from the spool 810 depending on the direction of rotation (e.g., clockwise or counterclockwise).

The cord 551b is also coupled to the spool 810 to apply a tangential force to the spool 810 opposite the constant-force extension springs 820, 821. The cord 551b is wrapped or wound (and unwrapped or unwound) about the spool 810, for example, in a cord channel (not shown) adjacent the one or more spring channels (not shown). The base 800 may include a boss 804 that guides extension and retraction of the cord 551b both into and out of the adjustment mechanism 550 and around the spool 810. In operation, the cord 551b may be guided by the boss 804 and extend out from the adjustment mechanism 550a into the band 530, threading through the castellation 533 in the opening 536 as shown and described in FIG. 7A. In another embodiment, another constant-force extension spring (not shown) may wind or wrap around the boss 804 and supply additional tension to the cord 551b in the manner similar to the constant-force extension springs 387, 388 described in respect to FIGS. 3 and 4.

The adjustment mechanism 550a may also include a gearing mechanism (not shown) that allows either one or both of the extension springs 820, 821 to apply tangential force to the spool 810, thus allowing for different levels of generally constant force as appropriate to different usage situations of the head-mounted display unit 500. For example, a user relaxing on the couch with the head-mounted display unit 500 may prefer a lighter tension than a user watching or playing a rousing game of tennis using the head-mounted display unit 500. A variety of constant-force tension levels may also be achieved by changing a diameter of the spool 810, thus changing the mechanical advantage.

Referring to FIG. 8B, as an alternative to the adjustment mechanism 550a, 550b, the head support 520 may instead include one or more adjustment mechanisms 850. The adjustment mechanism 850 includes the base 800, the housing 830, and the cord 551a as generally described with respect to the adjustment mechanism 550a. The adjustment mechanism 850 further includes a first spool 860, a second spool 861, an extension spring 851, and a third spool 870. The first spool 860 rotates about a first boss 860a that forms a first axis of rotation and is thereby rotatably coupled to the base 800. The second spool 861 rotates about a second boss 861a that forms a second axis of rotation and is thereby rotatably coupled to the base 800. The third spool 870 rotates about a third boss 870a that forms a third axis of rotation and is thereby rotatably coupled to the base 800. The first, second, and third bosses 860a, 861a, 870a are spaced apart and may be formed integrally with the housing 830 or otherwise coupled thereto. The first, second, and third axes are parallel with and spaced apart radially from each other, for example, in three-spaced apart positions with a line extending therethrough.

The extension spring 851 is coupled to, wound about, and extends between the first spool 860 and the second spool 861 to transfer torque therebetween and ultimately to the third spool 870. As is shown, a first end of the extension spring 851 is rotatably coupled base 800, for example, being fixedly coupled to the first spool 860 to rotate therewith and being wound therearound in a first direction (i.e., clockwise starting from the center). A second end of the extension spring 851 rotatably coupled to the base 800, for example, being fixedly coupled to the second spool 861 to rotate therewith and being wound therearound in a second direction, opposite the first (i.e., clockwise starting from the center). The extension spring 851 extends between the first spool 860 and the second spool 861 such that movement and torque is transferred therebetween. The first spool 860 and the second spool 861 may have different radii (e.g., with the second spool 861 being larger), such that the tangential force applied therebetween (i.e., at the radius) results in differential torque output thereof and unequal movement.

Torque is transferred between the second spool 861 and the third spool 870 via a geared relationship. The second spool 861 includes a first gear 861b that rotates in unison therewith (e.g., being coupled thereto or formed therewith), while the third spool 870 includes a second gear 870b that rotates in unison therewith (e.g., being coupled thereto or formed therewith). The first gear 861b engages the second gear 870b (e.g., being enmeshed therewith) to transfer torque between the second spool 861 and the third spool 870. The torque output and rotation of the second spool 861 and the third spool 870 are in opposite rotational directions. As shown, first gear 861b of the second spool 861 and the second gear 870b of the third spool 870 may have the same diameter and tooth count, resulting in the same torque output and rotational speed as each other, but may instead have different diameters and/or tooth count. The first gear 861b may have a radius that is smaller than the radius of the second spool 861, while the second gear 870b may have a larger radius than the third spool 870.

The cord 551a is coupled to and wound about the third spool 870, such that the torque transferred by the extension spring 851 to the third spool 870 maintains the cord in tension. As discussed previously, the torque transferred from the extension spring 851 to the second spool 861, and from the second spool 861 to the third spool 870 via the geared connection.

While the axes of rotation of the spools 860, 861, 870 are spaced apart radially, it is further complicated that the third spool 870 (i.e., for the cord 551a) may be coupled to, be coaxial, and rotate in unison with the second spool 861, but this relationship would lead to a thicker (i.e., in the axial direction) adjustment mechanism with the cord 551a and the extension spring 851 being wound in parallel planes. Instead, as is shown, by spacing apart the spools radially, the adjustment mechanism 850 achieves a lesser thickness, which may be advantageous to reduce distance by which the head support 520 protrudes from the head of the user.

The adjustment mechanism 550a and/or the adjustment mechanism 850 may be used on either or both sides of the head-mounted display unit 500 to generate tension along the cord 551b, for example, as adjustment mechanisms 550a, 550b. Alternatively, the adjustment mechanism 550a (or multiple adjustment mechanisms similar to adjustment mechanism 550a) may be located in the middle of the band 530, for example, proximate to the power connector 532, such that the cord 551b extends toward the ears of a user in two directions. An advantage of the adjustment mechanism 550a described in FIG. 8 is that no change in length of the head support 520 occurs at the location of the adjustment mechanism 550a, which generally allows the ears and the temples of a head of a user to be unaffected by length changes of the head support 520. In other words, length changes of the head support 520 of FIGS. 5-8 are restricted to length changes of the band 530, which may be less noticeable and/or more desirable in terms of comfort for a variety of users.

Figure 9:
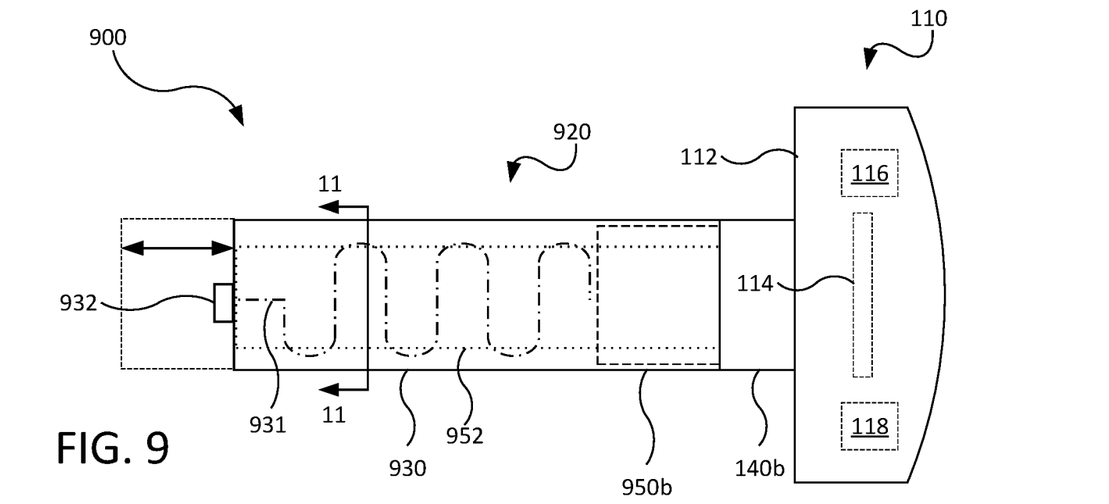
FIG. 9 is a side view of another head-mounted display unit in a retracted state and an expanded state (dashed lines).
Figure 10:
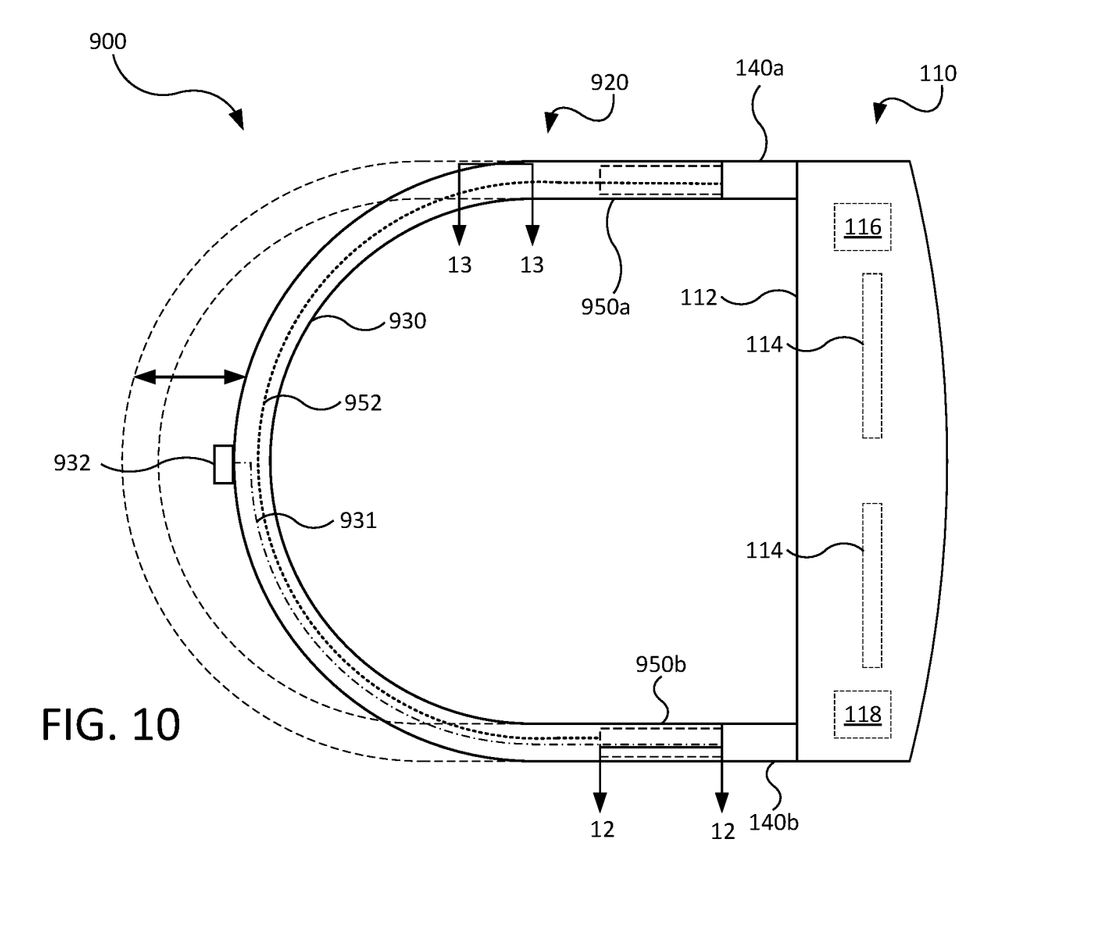
FIG. 10 is a top view of the head-mounted display unit of FIG. 9 in the retracted state and the expanded stated (dashed lines).

Referring to FIGS. 9 and 10, a head-mounted display unit 900 is a variation of the head-mounted display units 100, 500 and includes the display assembly 110 (described above) and a head support 920. As with the head supports 120, 520, the head support 920 is adjustable in length between a retracted position (solid lines) and an extended position (dashed lines). The head support 920 is configured to provide a generally constant force regardless of the length thereof. The head support 920 includes a band 930, one or more attachment mechanisms 140a, 140b (as described above; e.g., two as shown on the left and right sides), and one or more adjustment mechanisms 950a, 950b (hidden; illustrated in long-dash lines; e.g., two as shown on the left and right sides).

As with the bands 130, 530, the band 930 forms a primary portion of the head support 920 and engages the head of the user to support the head-mounted display unit 100 worn on the head of the user. The band 930 is formed of or otherwise includes a stretchable material, such as silicone, a constant-force structure, an engineered textile, an engineered elastomer, and/or a folded material (e.g., accordion, honeycomb, etc.) that provides structure and allows expansion and retraction of the band 930. As with the bands 130, 530, the band 930 may also be configured to transfer electrical power from a power source (e.g., an external battery) to the display assembly 110. For example, the band 930 may include a power cable 931 (hidden; illustrated in a dash-dot line) that extends from a power connector 932 to the attachment mechanism 140 along a serpentine path as shown, either bypassing or extending through the adjustment mechanism 950b.

Each of the attachment mechanisms 140a, 140b removably couples the head support 920 to the display assembly 110. One of the attachment mechanisms 140b also electrically connects to a corresponding power connector (not shown) of the display assembly 110.

In this example, the adjustment mechanism 950a includes a tape 952 (hidden; illustrated in short dashed lines) that extends through the band 930 and is retractable into and extendable from the adjustment mechanism 950a, thereby shortening and lengthening, respectively, the head support 920. The tape 952 can be inelastic, of singular construction, or formed from multiple parallel strands. In the case of the head support 920 including the single adjustment mechanism 950a, the tape 952 may extend and retract from the adjustment mechanism 950a on one side of the head-mounted display unit 900 and be fixedly coupled to the other side thereof (e.g., to the attachment mechanism 140b). The tape 952 can be formed, for example, of manufactured fibers, such as a metal-spun liquid-crystal polymer or other flexible metal, that can both wrap or wind and support coupling of metallic constant-force extension springs.

As the tape 952 retracts into and is extended from the adjustment mechanism 950a to span different lengths between the two sides of the head-mounted display unit 900, the band 930 similarly decreases or increases in length. The stretchable material forming or included within the band 930 may also surround the adjustment mechanism 950a.

In the example of FIG. 9, both the power cable 931 of the band 930 and the tape 952 of the adjustment mechanism 950a extend generally linearly through the band 930 as it stretches and contracts to fit heads of varying users. Maintaining shape and tension of the band 930, the power cable 931, and the tape 952 while allowing movement of the power cable 931 and the tape 952 within the band 930 can be achieved using castellations as described in reference to FIGS. 11A and 11B and the adjustment mechanism 950a described in reference to FIG. 12.

Figure 11A:
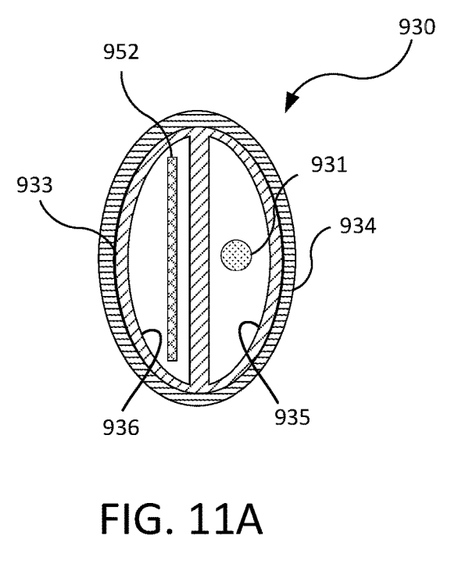
FIGS. 11A and 11B are cross-sectional views of a band of the head-mounted display unit of FIG. 9 taken along line 11-11 in FIG. 9.

Referring to FIG. 11A, the band 930 of FIGS. 9 and 10 is shown in shaded cross-section. At this cross-sectional location, the band 930 includes the power cable 931 (e.g., with a dotted pattern), a castellation 933 (e.g., with a diagonal line pattern), a support material 934 (e.g., with a horizontal line pattern), and the singular tape 952 (e.g., with a cross-hatch pattern).

The castellation 933 acts as a support for the band 930 and can be formed of a rigid, smooth material, for example, a polymer, that allows smooth movement of the power cable 931 and the tape 952 through the band 930 while prohibiting the power cable 931 and the tape 952 from frictionally interfering with the support material 934. The castellation 933 acts, for example, as a washer or bearing inside the sleeve of support material 934.

The power cable 931 extends through a first opening 935 in the castellation 933 and the tape 952 extends through a second opening 936 in the castellation 933 in this example, though other routings are possible that allow the band 930 to stretch without interference between the power cable 931 and the tape 952. The castellation 933 is shown with two openings 935, 936, but any number of openings from one to many are possible. The size of the openings 935, 936 can also vary, and features can be added to the castellation 933 (e.g., rollers, surface treatments, bearings, etc.) to further reduce friction caused by movement of the power cable 931 and the tape 952 within the band 930.

The support material 934 can be formed of or otherwise include a stretchable material, such as silicone or an engineered elastomer, that allows expansion and retraction of the band 930 while providing support and locating features (not shown) for the castellation 933. Though a single castellation 933 is shown in FIG. 11A, the band 930 generally includes multiple castellations, such as the castellations further described in respect to FIG. 13.

Figure 11B:
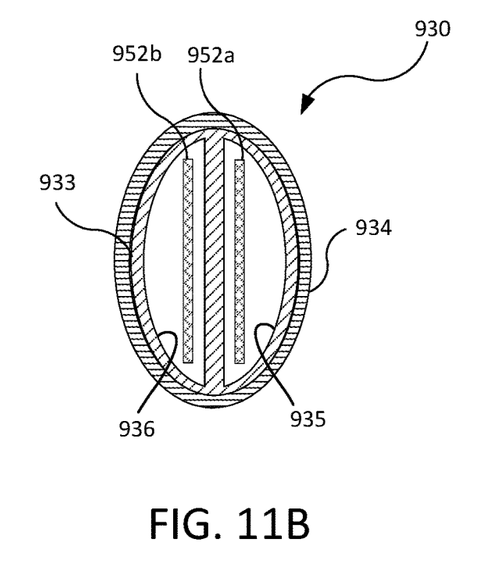

Referring to FIG. 11B, the band 930 of FIGS. 9 and 10 is shown in shaded cross-section in an alternative configuration to that of FIG. 11A. For example, the band 930 in FIG. 11B includes the castellation 933 (e.g., with a diagonal line pattern), support material 934 (e.g., with a horizontal line pattern), and two tapes 952a, 952b routed generally parallel to each other through the band 930 (e.g., with cross-hatch patterns). An outer cover, for example, a fabric material, is not shown. The tape 952a extends through a first opening 935 in the castellation 933 and the tape 952b extends through a second opening 936 in the castellation 933 in this example. The parallel tapes 952a, 952b are consistent with use of two adjustment mechanism 950a, 950b each capable of providing adjustable length to the head support 920a.

Figure 12:
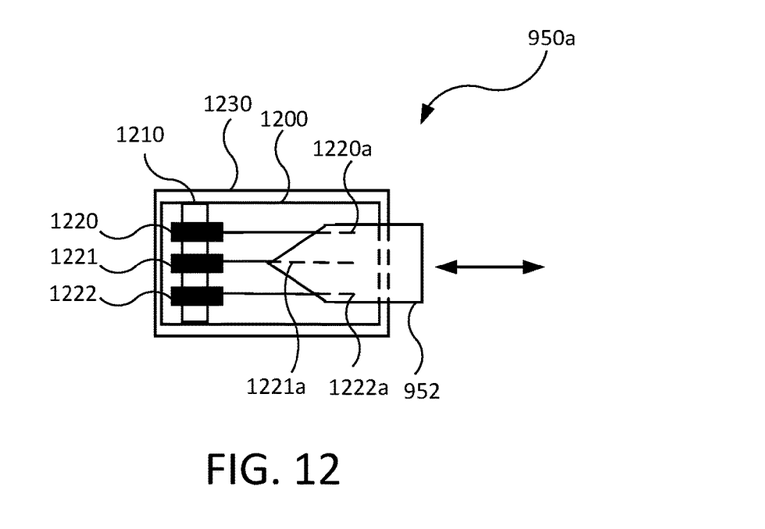
FIG. 12 is a cross-sectional view of an adjustment mechanism of the head-mounted display unit of FIG. 9 taken along line 12-12 in FIG. 10.

Referring to FIG. 12, the adjustment mechanism 950a of FIGS. 9 and 10 includes a base 1200, a spool or boss 1210, one or more constant-force extension springs 1220, 1221, 1222, and a tape 952. Though three constant-force extension springs 1220, 1221, 1222 are shown and described here, the number of constant-force extension springs may vary from one to many. Though the tape 952 is shown as a single piece coupled to the three constant-force extension springs 1220, 1221, 1222, the tape 952 may be formed from three parallel pieces, each piece coupled to one of the constant-force extension springs 1220, 1221, 1222. The adjustment mechanism 950a may further include a housing 1230 that surrounds and covers from view the base 1200, the boss 1210, the constant-force extension springs 1220, 1221, 1222, and at least a portion of the tape 952. The housing 1230 is coupled to, surrounds, or may form a portion of the base 1200.

The spool or boss 1210 is rotatably coupled to the base 1200. For example, the boss 1210 may be a cylindrical post spanning between walls of the base 1200. In another example, the base 1200 may include a boss (not shown; e.g., a protrusion or post) that is received by a central aperture (not shown) of the spool or boss 1210 and around which the spool or boss 1210 rotates. The spool or boss 1210 serves to position the constant-force extension springs 1220, 1221, 1222 on the base 1200.

The constant-force extension springs 1220, 1221, 1222 have first ends (not shown) wrapped or wound around the boss 1210 and second ends 1220a, 1221a, 1222a coupled to the tape 952. The second ends 1220a, 1221a, 1222a are shown in long-dashed (hidden) lines as being covered by the tape 952 in this sectional view of the adjustment mechanism 950a. The constant-force extension springs 1220, 1221, 1222 work in parallel to apply a generally constant force between the boss 1210 and the tape 952.

The constant-force extension springs 1220, 1221, 1222 are configured as the constant-force extension springs 386, 387, 388 described in respect to FIGS. 3 and 4, for example, being formed of several coils of a flat metal material (e.g., steel, copper) that extend between the first ends (not shown) around the boss 1210 and the second ends 1220a, 1221a, 1222a coupled to the tape 952a. Tension is generated by extension of the tape 952a, for example, when the band 930 is stretched to fit a head of a user, and the constant-force extension springs 1220, 1221, 1222 are unwound from the spool 1210.

In operation, the tape 952 may extend out from the adjustment mechanism 950a into the band 930, threading through the castellation 933 in the opening 936 as shown and described in FIG. 11A. Though one adjustment mechanism 950a is described in FIG. 12, two adjustment mechanisms 950a, 950b may be used, for example, each having three constant-force extension springs coupled to a tape (e.g., tapes 952a, 952b), the two tapes extending through opposing openings of castellations along the band 930 from opposite sides of the head support 920.

In another example, the adjustment mechanism 950a may also include a gearing mechanism (not shown) that allows different combinations of the constant-force extension springs 1220, 1221, 1222 to apply force to the tape 952, thus allowing for different levels of generally constant force applied to the tape 952 as appropriate to different usage situations of the head-mounted display unit 900. A variety of constant-force tension levels may also be achieved by changing a diameter of the boss 1210, thus changing the mechanical advantage.

In another embodiment, the adjustment mechanism 950a (or multiple adjustment mechanisms 950a, 950b) may be located in the middle of the band 930, for example, proximate to the power connector 932, such that the tape 952 of FIG. 11A (or the two tapes 952a, 952b of FIG. 11B) extend(s) toward the ears and the temples of a user. An advantage of the adjustment mechanism 950a described in FIG. 12 is that no change in length of the head support 920 occurs at the location of the adjustment mechanism 950a. Another advantage of the adjustment mechanism 950a described in FIG. 12 is that additional connections, such as power connections or data connections, can be run along the tape 952, for example, adjacent to the constant-force extension springs 1220, 1221, 1222.

Figure 13:
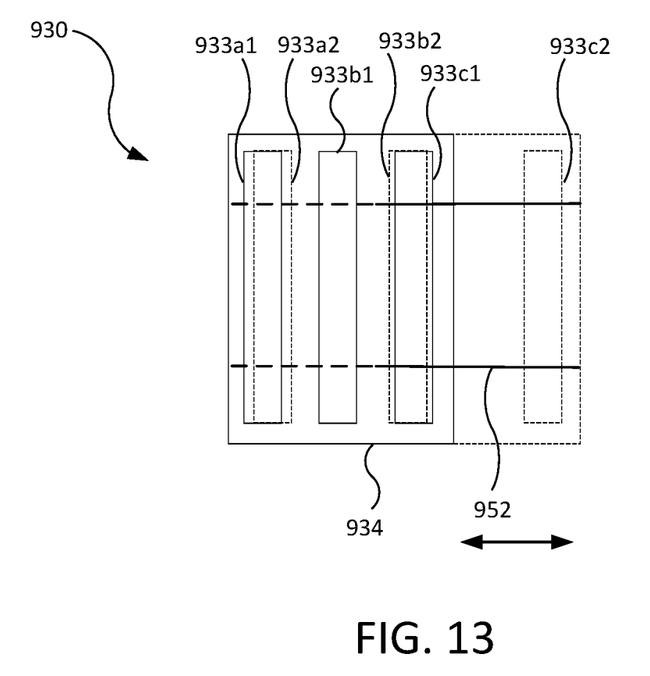
FIG. 13 is a cross-sectional view of a band of the head-mounted display unit of FIG. 9 taken along line 13-13 in FIG. 9.

Referring to FIG. 13, the band 930 of FIGS. 9 and 10 is shown in cross-section in a nominal or resting position (e.g., in solid line) and in an expanded or stretched position (e.g., in dotted line). At this cross-sectional location, the band 930 includes three castellations 933a, 933b, 933c, a support material 934, and the tape 952.

The castellations 933a, 933b, 933c act as a support for the band 930 and can be formed of a rigid, smooth material, for example, a polymer, the defines openings through which smooth movement of the tape 952 occurs while at the same time prohibiting the tape 952 from frictionally interfering with the support material 934. The castellations 933a, 933b, 933c act, for example, as washers or bearings inside the sleeve of support material 934.

The support material 934 can be formed of or otherwise include a stretchable material, such as silicone or an engineered elastomer, that allows expansion and retraction of the band 930 while providing support and locating features (not shown) for the castellations 933a, 933b, 933c. The locating features can restrict movement of the castellations 933a, 933b, 933c within the band 930.

For example, FIG. 13 shows that castellation 933a starts in a first position, denoted by 933a1, when the band 930 is static or unstretched. When the band 930 stretches, castellation 933a can move to a second position, denoted by 933a2. Similar static positions and stretched positions are shown for the castellations 933b, 933c, that is, as denoted by 933b1 and 933c1 for the static positions and 933b2 and 933c2 for the stretched positions. The castellations 933a, 933b, 933c can move apart and toward each other during expansion and retraction of the support material 934 as the band 930 adjusts in length to fit heads of varying users while maintaining generally constant force using the tensioned tape 952. Though three castellations 933a, 933b, 933c are shown in this example, dozens or even hundreds of castellations similar to these castellations 933a, 933b, 933c may be located along the band 930 within the support material 934.

In the static position, the castellations 933a1, 933b1, 933c1 may be spaced between 1 and 5 millimeters apart from each other in order to retain the overall shape of the band 930 while reducing friction between the tape 952 and the support material 934. In the extended or stretched position, the castellations 933a2, 933b2, 933c2 may be spaced between 5 and 15 millimeters apart to allow for compression and expansion of the support material 934 to achieve a total extension within the range of 40-80 millimeters for the overall band 930 while retaining generally constant force against heads of varying users wearing the head support 920.

The tape 952 is denoted within FIG. 13 as having a fixed portion (in solid line) and a retractable or windable portion (in dotted line). The tape 952 either winds or unwinds within the adjustment mechanism 950a (e.g., see FIG. 12) as the band 930 expands or retracts.

The head supports 120, 520, 920 described above are shown including singular headbands (e.g., bands 130, 530, 930) that extend from a first temple of a user across a back of a head of the user to the other temple of the user. In other embodiments, additional or alternative headbands with corresponding adjustment mechanisms can be designed to extend from the first temple of the user across a top of the head of the user to the other temple of the user. In compound head supports of this type (not shown), greater comfort can be achieved, and the user could don the head support in a similar manner to that used to don, for example, a baseball cap, a tipping motion from back to front.

It should be noted that while different features are described in the specification with different identifiers (e.g., first, second, and third) to distinguish therebetween, the claims may use different identifiers to distinguish between different features recited therein, for example, based on the order in which claim elements are introduced. For example, with reference to the adjustment mechanism 850, the third spool 870 as described in the specification may instead be recited in the claims as a spool or a first spool.

In general, a physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR Include Virtual Reality and Mixed Reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone).

The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, such as from sensors 116 or user profiles, to improve the delivery to users of content associated with the display 114. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based delivery of content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be displayed to users by inferring preferences based on non-personal information data or a bare minimum amount of personal information, such as the content being requested by the device associated with a user, other non-personal information available to the device, or publicly available information.

What is claimed is:

1. A head-mounted display unit to be worn on a head of a user, comprising:
   a display assembly; and
   a head support coupled to the display assembly that supports the head-mounted display on the head of the user, the head support comprising:
   a band that is formed from a stretchable material to allow for expansion and contraction of the band to thereby shorten and lengthen the band,
   an inelastic cord that extends through the band, is coupled to a first side of the head support, and is coupled to an opposing second side of the head support, and
   an adjustment mechanism that is coupled to the cord and is configured to extend and retract the cord to thereby shorten and lengthen the head support, wherein a length of the band increases when the cord is extended and the length of the band decreases when the cord is retracted.

2. The head-mounted display unit of claim 1, wherein the cord extends past a middle of the band.

3. The head-mounted display unit of claim 2, wherein the cord is located inside the band at the middle of the band.

4. The head-mounted display unit of claim 3, wherein the cord is coupled to the adjustment mechanism at a first location that is located on the first side of the head support, and the cord is coupled to the band at a second location that is located on the opposing second side of the head support, the first location and the second location being located on opposite sides of the middle of the band.

5. The head-mounted display unit of claim 1, wherein the band is configured as a sleeve and the cord extends through an inside of the sleeve.

6. The head-mounted display unit of claim 1, wherein the adjustment mechanism includes a spool, and the cord is coupled to the spool.

7. The head-mounted display unit of claim 6, wherein the adjustment mechanism includes a spring that is configured to apply torque to the spool.

8. A head support for supporting a display assembly that is worn on a head of a user, the head support comprising:

a first attachment mechanism that is configured to removably couple the head support to the display assembly;

a second attachment mechanism that is configured to removably couple the head support to the display assembly;

a stretchable band that is coupled between the first attachment mechanism and the second attachment mechanism, wherein the stretchable band defines castellations that are spaced apart from one another and each of the castellations defines a set of openings;

a cord that is located inside the stretchable band and routed through one of the sets of openings of a respective one of the castellations; and a spool that is configured to extend and retract the cord to thereby shorten and lengthen the stretchable band.

9. The head support of claim 8, wherein the stretchable band is formed from silicone.

10. The head support of claim 8, wherein the stretchable band is formed from a textile material.

11. The head support of claim 8, wherein the stretchable band is configured as a sleeve and the cord extends through an inside of the sleeve.

12. The head support of claim 8, wherein the cord extends past a middle of the stretchable band that is located between the first attachment mechanism and the second attachment mechanism.

13. The head support of claim 12, wherein the cord is located inside the stretchable band at the middle of the stretchable band.

14. The head support of claim 8, further comprising:

a spring that is configured to apply torque to the spool to maintain the cord in tension.

15. The head support of claim 8, further comprising:

a support that is located inside the stretchable band, wherein the cord is routed through an opening in the support.

16. The head support of claim 8, wherein the first attachment mechanism is configured to removably couple the head support to a left side of the display assembly and the second attachment mechanism is configured to removably couple the head support to a right side of the display assembly.

17. The head support of claim 8, wherein the stretchable band is configured to extend from a rear of the head of the user towards ears and temples of the user.

18. The head support of claim 8, wherein the castellations are configured to move apart and toward each other during shortening and lengthening of the stretchable band.

19. A head-mounted display unit to be worn on a head of a user, comprising:

a display assembly; and a head support coupled to the display assembly that supports the head-mounted display unit on the head of the user, the head support comprising:

a stretchable band, a cord that is routed through an inside of the stretchable band between a first location and a second location, wherein a middle of the stretchable band is located between the first location and the second location, and the cord is coupled to the head support at the first location and the second location, and an adjustment mechanism that is configured to extend and retract the cord to thereby shorten and lengthen the stretchable band.

20. The head-mounted display unit of claim 19, wherein the stretchable band is configured as a sleeve.

21. The head-mounted display unit of claim 20, wherein the cord is located within the sleeve of the stretchable band at the middle of the stretchable band.

22. The head-mounted display unit of claim 19, wherein the adjustment mechanism includes a spool, and the cord is coupled to the spool.

23. The head-mounted display unit of claim 22, wherein the adjustment mechanism includes a spring that is configured to apply torque to the spool.

* * * * *